US007827171B2

(12) United States Patent
Brosseau et al.

(10) Patent No.: US 7,827,171 B2
(45) Date of Patent: Nov. 2, 2010

(54) COPY DETECTION USING CONTOUR ANALYSIS

(75) Inventors: William A. Brosseau, Stratford, CT (US); Bertrand Haas, New Haven, CT (US); Claude Zeller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1365 days.

(21) Appl. No.: 11/240,888

(22) Filed: Sep. 30, 2005

(65) Prior Publication Data
US 2007/0078906 A1    Apr. 5, 2007

(51) Int. Cl.
G06F 7/00 (2006.01)
G06F 17/30 (2006.01)
(52) U.S. Cl. .......................... 707/723; 707/727
(58) Field of Classification Search .................. 707/203, 707/104.1, 999.2; 713/176; 382/145, 276; 358/406
See application file for complete search history.

(56) References Cited
U.S. PATENT DOCUMENTS 6,108,703 A * 8/2000 Leighton et al. ............ 709/226
6,125,213 A * 9/2000 Morimoto ................... 382/263
6,381,037 B1 * 4/2002 Balasubramanian et al. .......................... 358/3.23
7,158,267 B2 * 1/2007 Chiu ........................... 358/406
2002/0040204 A1 * 4/2002 Dev et al. .................... 604/20
2003/0034992 A1 * 2/2003 Brown Elliott et al. ...... 345/690
2004/0005245 A1 * 1/2004 Watson et al. ............... 422/65
2004/0086168 A1 * 5/2004 Kuwabara ................... 382/145
2004/0135898 A1 * 7/2004 Zador ....................... 348/222.1
2004/0202382 A1 * 10/2004 Pilu .......................... 382/276
2005/0248972 A1 * 11/2005 Kondo et al. ................ 365/125
2006/0023970 A1 * 2/2006 Wang ......................... 382/312
2006/0224895 A1 * 10/2006 Mayer ........................ 713/176

* cited by examiner

Primary Examiner—Charles Rones
Assistant Examiner—Fariborz Khoshnoodi
(74) Attorney, Agent, or Firm—George M. Macdonald; Angelo N. Chaclas

(57) ABSTRACT

Systems and methods for detecting copies of images are described. In one example, the system utilizes a threshold based contour analysis technique that uses known contour ratios to determine if a scan of an image or document being tested is a first generation scan of an original or of a higher generation copy. In another example, a method for calibrating the copy detection system for use with a particular printer and scanner in described.

15 Claims, 10 Drawing Sheets

US 7,827,171 B2

COPY DETECTION USING CONTOUR ANALYSIS

CROSS REFERENCE TO RELATED APPLICATIONS

The present application is related to co-pending, commonly owned U.S. patent application Ser. No.: 11/240,889, filed Sep. 30, 2005, entitled COPY DETECTION SYSTEM USING CORRELATIONS OF COPY DETECTION PATTERNS, and co-pending, commonly owned U.S. patent application Ser. No.: 11/241,293, filed Sep. 30, 2005, entitled METHOD AND SYSTEM FOR OPTIMIZING PRINT-SCAN SIMULATIONS which are incorporated herein by reference.

FIELD OF THE INVENTION

The present invention relates to systems and methods for detecting copies of printed images, and in particular to systems and methods for detecting copies of printed images using a contour analysis of non-random images to detect copies.

BACKGROUND OF THE INVENTION

Digital technology has become pervasive in the creation and distribution of many types of media. Documents may be created and distributed in digital form both electronically and embodied in a carrier media such printed paper. Many valuable documents are produced and distributed in paper form that include printed images (possibly also including text) such as postal indicia and certificates of authenticity distributed with goods as part of a brand protection scheme.

Various technologies are now readily available for making high-quality copies of flat documents. Many image capture systems CCD cameras, CMOS sensors and scanners are readily available and that provide excellent reproduction accuracy and precision. Similarly, powerful digital media editing software and accurate and precise printing systems are readily available for outputting such unauthorized copies and counterfeit documents. As a result, unauthorized copying and counterfeiting of documents such as indicia, bank notes, checks, and identification documents is a serious concern. Accordingly, document creators and distributors must seek out more advanced technologies to thwart the efforts of such counterfeiters. Otherwise, members of society could not rely on the identity, authenticity and purported source of valuable documents.

Content owners may wish to provide identification, authentication and non-repudiation for certain printed images and/or documents including images. Several types of physical document copy detection systems are known including copy detection patterns (CDPs) that may be placed in a particular region of a document reserved for the purpose. Furthermore, several copy detection systems are known that utilize fragile watermarks, visible and invisible digital watermarks that are applied to an actual image or document. Commercially available systems include those available from Digimarc Corporation of Beaverton, Oreg. and Mediasec Technologies, LLC of Providence, R.I.

Copy detection systems that employ watermark or copy detection pattern (CDP) recovery must modify the target image. Accordingly, if the document owner does not wish to modify the original document, such techniques may not be used. Accordingly, there is a need for a copy detection system that does not require that the original image or document be modified. Additionally, there is an additional need for a copy detection system that is reasonably efficient.

SUMMARY OF THE INVENTION

The present invention provides systems and methods for detecting copies of documents, and in certain embodiments to systems and methods for detecting copies of documents using a threshold based contour analysis technique that utilizes known contour ratios to determine if a scan of an image or document being tested is a first generation scan of an original or of a higher generation copy. In one illustrative embodiment, the system and method provide for calibrating the test system to a particular printer and scanner in developing a range of acceptable contour ratios.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
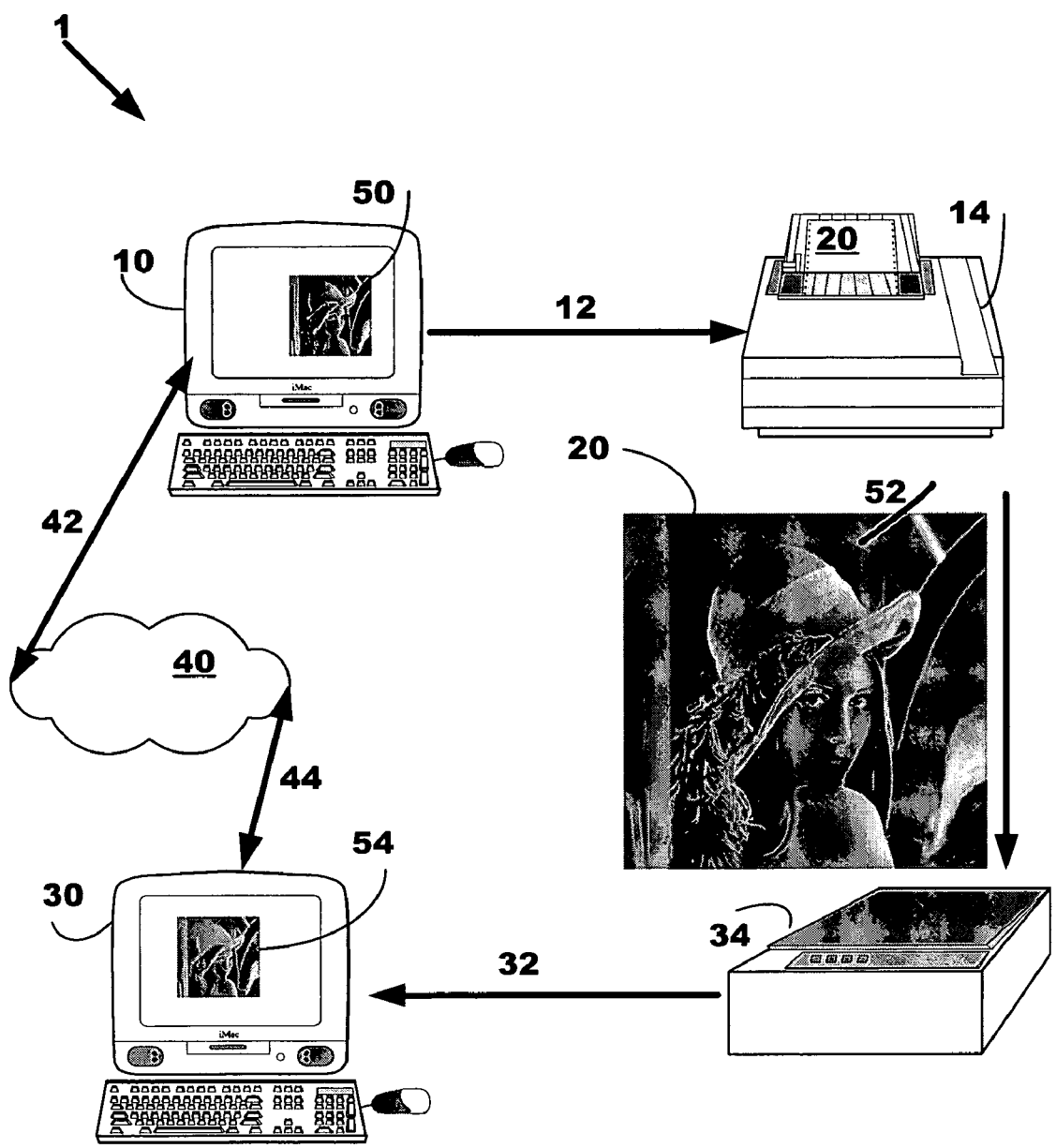
FIG. 1 is a block diagram of a system for detecting copies of images according to an illustrative embodiment of the present application.

Commercially available watermarking and copy detection pattern (CDP) based copy detection systems typically test the authenticity of an image by modifying the image to include a watermark or test pattern. The Illustrative embodiments described herein provide a threshold-contour based copy detection system that may be used to detect physical copies of images and/or documents without modifying the subject image.

It is an object of the present application to describe a copy detection system that does not require modification of the image under test. It is a further object of the present application to describe a copy detection system that utilizes a threshold and contour measurement technique to detect copies. It is yet a further object of the present application to describe a system and method for calibrating the threshold-contour measurement system for use with a particular printer and scanner.

In general, an illustrative embodiment of the copy detection system may be described with a test image. A digital (non-random) image is printed into an "official" print (such as the Lena test image). After circulation or transport of the official print or document, it arrives at a verification system and is scanned. The verification system must then decide whether the scan is from an authentic original official print or from a copy of the official print. The illustrative embodiments of the present application utilizes the global effect of print-scan distortions on non-random images (that is a global increase in entropy) to detect how many times such a process occurred. Since copies are produced by a scan and print process (and we are not considering "replay attack" reprint copies), by detecting if the scanned image has been printed and scanned more than once it is possible to detect a copy.

The images considered in the illustrative embodiments are non-random images. In a random image, the geometric complexity of the image is at a maximum, so the inherent introduction of geometric noise from printing and scanning cannot increase the entropy and the only visible effect that could be detected is the shrinkage of the range of gray levels, which decreases the entropy. It is not necessary to precisely define how "non-random" an image must be to be accurately processed by the systems described here, but for illustrative purposes, images clearly representing something to the human eye such as the Lena test image are sufficiently non-random.

The copy detection systems and methods describe are preferably utilized with a known type of printer and scanner. The system is preferably calibrated for use with such known type of printer and scanner for the most accurate results. However, variations in the printer and scanner type may be acceptable. For simplicity and clarity, the illustrative embodiments described herein process a grayscale image. However, the systems and methods described may be alternatively used with other types of images such as color images as well as grayscale and black and white images. Additionally, the techniques described may be alternatively applied to a portion of an image or to a portion of a document to determine if the image and/or document are copies. Furthermore, several image-processing techniques described with reference to the illustrative embodiments herein are known. Accordingly, such techniques and algorithms will not be described in detail.

The image distortions introduced by the physical transformation of printing and scanning come from various physical effects of the devices. For example, when using inkjet printers, the effects include print growth of ink droplets and overlapping of large droplets. When using thermal printers, the effects include thermal history and diffusion in printing elements of a thermal printhead. Several image capture technologies such as scanners and cameras may be used. When using a flatbed scanner, imperfect scanner grid positioning (with respect to the printing grid) may cause distortion. These distortions have two opposing effects. First, such effects reduce the complexity of the histogram (and therefore of the image) by shrinking the range of gray levels used. Second, such effects introduce noise into the geometry of the image, and therefore increase the complexity of the image. The overall effect in a non-random image is an increase in the entropy of the image. The more an image is printed and scanned, the stronger the effects (within reasonable limits). The copy detection systems and methods described herein measure this effect and utilize the measurement to determine if a scan is of an original official image or a counterfeit copy.

The idea for measuring it is to compute, for a given region (which may contain many isolated "islands") of the image, the "A2C" ratio of the Area of the region by the Circumference of the region. As used herein, the term circumference is used to describe the length of the contour in a number of pixels. To avoid rescaling this ratio when comparing it in the initial digital image and the scanned image, we will take here the ratio of the area by the square of the circumference (so the denominator and the numerator have the same unit of measure). Since the entropy increases with print-scan processes, the circumference of a given region becomes more complex and the ratio becomes smaller.

There is an optimal range of initial A2C ratios where the ratio decrease after the second print-scan is substantially maximized. An illustrative embodiment of the present application provides a method for calculating a data set of these ratios for use with a particular printer and scanner. For illustrative purposes, a single effective test ratio (R=8.95) for the printer and scanner described herein has been provided and used. An appropriate decision threshold Y=8.6 was selected such that the threshold is reasonably set between the expected R of the digital image and the expected R" of the counterfeit copy. Accordingly, Y is meant to provide a good decision point that may be around the value of R' or the expected value of the ratio for the scanned original document. As can be appreciated, additional data points may be calculated using the methods described herein.

This optimal range is used below to define the region to consider. Moreover the decrease in the A2C ratios in this range after one print-scan should also be measured to be used later in deciding whether the scanned image comes form an original print or a copy. The determination of the optimal ratio range and the expected ratio decrease makes up the "calibration" embodiment.

We define the region to consider as the set of pixels up to a given gray level. In the initial image, this gray level, say Gi, is chosen so that the ratio Ri=Ai/Ci falls within the optimal range above. In the scanned image, the gray level, say Gs, is then chosen so that the area As of the region (the number of pixels up to this level) best approximates the area Ai of the region in the initial image. This definition of the region bypasses the difficulties introduced by the instability of the gray scale after printing and scanning. The circumference Cs of region can then be measured and the ratio Rs=As/Cs, computed. The decrease can be represented by D=Ri/Rs. If D is substantially larger than the one measured during the calibration, the scanned image is decided to come from a copied print, otherwise it is decided to come from an official print.

Referring to FIG. 1 a block diagram of a system for detecting copies of images (and/or documents including but not limited to postage indicia, currency, identification, title records and diplomas) 1 according to an embodiment of the present application is shown. An image 50 creation system 10 is connected to a printer 14 using communications channel 12 such as a USB cable. The system 10 processes the digital version of the image 50 to produce a printed image 52 on media 20 such as paper using a given type of printer 14 (the official printer). In this example, the image is the Lena test image. The printed image 20 then enters circulation until reaching the verification image capture device 34. Unfortunately, while in circulation, unscrupulous individuals might make an unauthorized copy of the printed image 20. Such fraudulent copies are usually scanned and reprinted with high quality devices. The document (or its unauthorized copy) is then captured at the verification system with a given type of scanner 34 (the official scanner) and the image of the scanned document is analyzed to detect whether it has been copied or not.

The flat bed scanner 34 is connected to the verification personal computer 30 using communications channel 32 such as a USB cable. In an alternative, the scanner is a camera, a hand held scanner, drum scanner or other image capture device such as a CMOS camera.

The personal computers 10, 30 are APPLE G5 based computers running OS X, but other suitable computers and programs such as other Apple computers and DELL PENTIUM 4 based computers running WINDOWS XP may be used. The processes described herein may be performed by an operator using Photoshop CS or could be programmed in Photoshop CS macros, GNU Image Manipulation Program scripts or in MATLAB. Alternatively, the processes but could be programmed in a general-purpose high-level computer language or assembly code. Other known computing systems, programming systems, communications systems and security systems may be utilized.

The personal computer 10 runs the original passive signature creation program and the verification computer 30 runs the passive signature retrieval and comparison copy detection program. It is assumed that the original passive signature data 50 is available at the verification computer 30. The original signature 50 could be transmitted from the creation computer 10 to the verification computer 30 using communication channels 42, 44 and network 40. Network 40 comprises the Internet, but other networks may be used. Alternatively, the original signature 50 could be sent through an intermediary such as a trusted third party (not shown).

Figure 2:
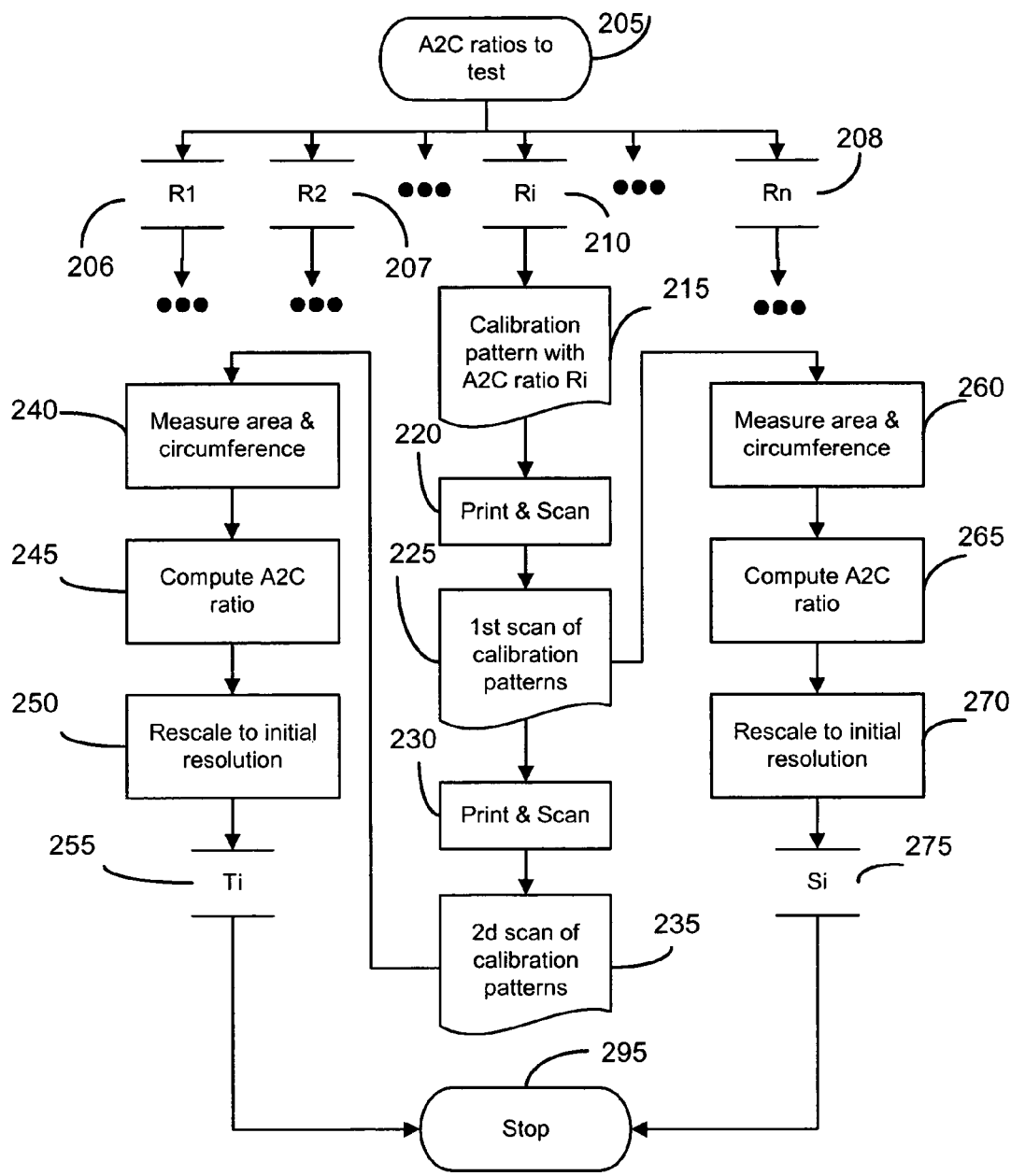
FIG. 2 is a flowchart showing a method for determining area to circumference (contour) test ratios using scanned calibration patterns according to an illustrative embodiment of the present application.

Referring to FIG. 2, a flowchart showing a method 200 for determining area-to-contour (A2C) test ratios using scanned calibration patterns according to an illustrative embodiment of the present application is shown. This process is a detection system calibration process. In step 205, the process begins.

In steps 206 through 210, the system prints test patterns of different ratios (see FIG. 4), namely R1, R2, . . . , Rn. Preferably, the system takes the ratios equally distant, so that $R(i+1)-R(i)$ is a constant d. In step 215, the representative process for Ri is described. In step 220, the system prints and scans the calibration pattern. In step 225, the system captures the first scan of the calibration pattern for processing. In step 260, the system measures the gray level giving the best approximation to the initial area, and in step 265, the system computes the A2C ratio of the first scans. Next, in step 270, the system rescales to the initial resolution (multiply the A2C ratio by resolution of printer and divide by resolution of the scanner) to get comparable ratios S1, S2, . . . , Sn in step 275 and stops for that execution branch or thread.

In step 230, the system reprints the first scans of the test patterns. In step 235 the system captures the $2^{nd}$ scan. In step 240, the system measures the area and circumference and in step 245 computes the A2C ratio for the second scan. Next, in step 250, the system rescales to the initial resolution to get comparable ratios T1, T2, . . . , Tn in step 255 and then stops. The scanner for the expected copies can be different (and usually of better resolution and quality) than that of the verifier. Similarly, the printer used to make a counterfeit copy is typically different than the original printer.

Figure 3:
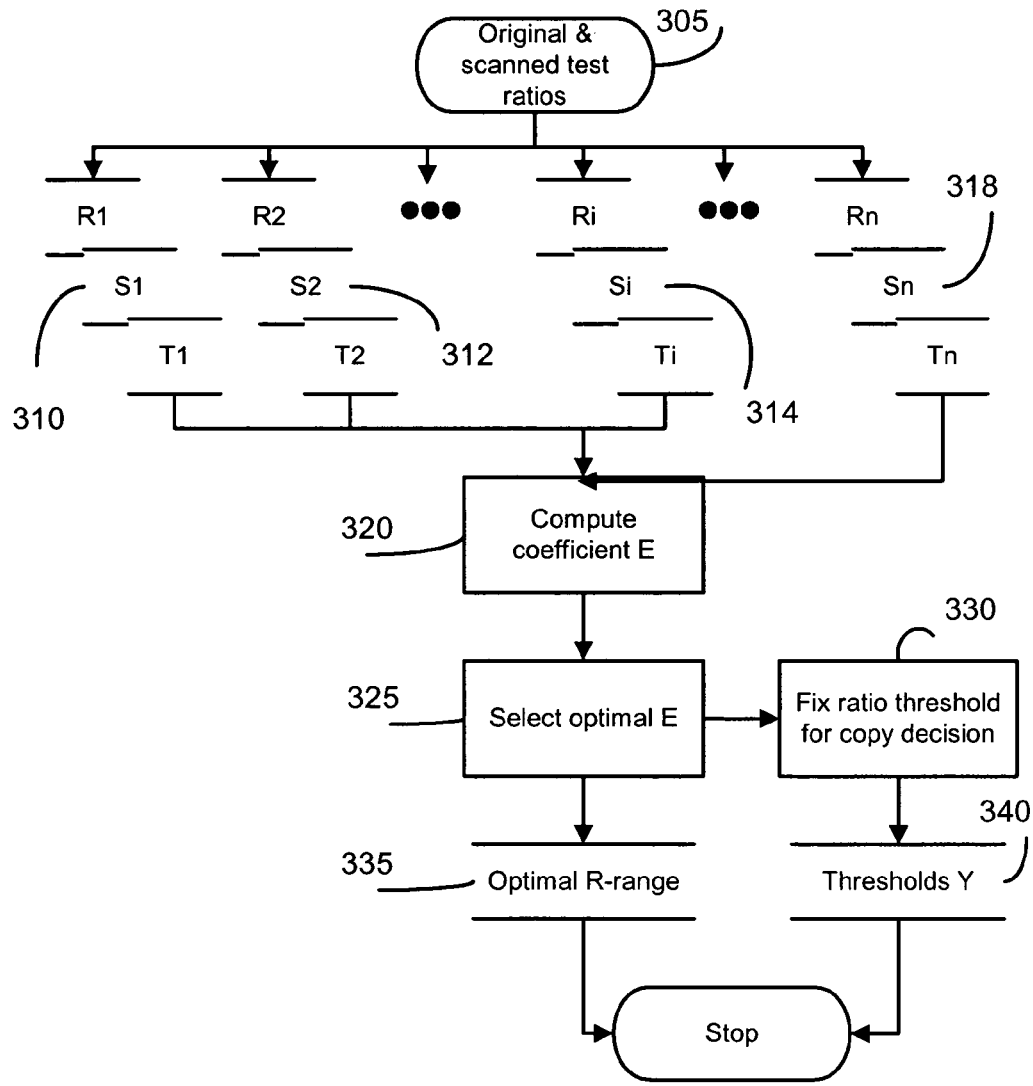
FIG. 3 is a flowchart showing a method for determining an optimal range of area to circumference (contour) test ratios using scanned calibration patterns according to an illustrative embodiment of the present application.

Referring to FIG. 3, a flowchart showing a method 300 for determining an optimal range of area to contour test ratios using scanned calibration patterns according to an illustrative embodiment of the present application is shown.

In step 305, the original and scanned test ratios are input. In representative steps 310 through 318, for each index i, the system computes a coefficient of efficiency $Ei=(Ri-Ti)/(Ri-Si)$ and passes it to step 320.

In step 325, the system selects an optimal E. The index k with highest coefficient Ek is the index of the best ratio Rk. We can define the range W of efficient ratios as ratios from $Rk-d/2$ to $Rk+d/2$.

In step 330, the system fixes a ratio threshold for copy detection. In step 335, the system determines an optimal range of R values and in step 340, the system selects appropriate ratio threshold values Y. In at least one embodiment, processing the threshold fitting to the expected area is by binary tree sorting. Those R and Y values may be published or distributed in some other secure or non-secured way such as through a trusted third party so that they are available at a verification station.

In an alternative embodiment that may provide more robust results, the range W is subdivided into a few number of more accurate ratio Rk1, Rk2, . . . Rkm. For each of them, ratios of first and second scan measured Sk1, Sk2, . . . , Skm and Tk1, Tk2, . . . , Tkm. In the alternative, a list of thresholds, for instance $Yi=(Ski+Tki)/2$, is associated with each Rki. More sophisticate formulas to compute Yi can be used in order to minimize incidents of false positives and false negatives. Accordingly, the result of the calibration is the set of pairs (Rk1, Y1), (Rk2, Y2), . . . , (Rkm, Ym) which is published or distributed in some other secure or non-secured way such as through a trusted third party so that they are available at a verification station.

Figure 4A:
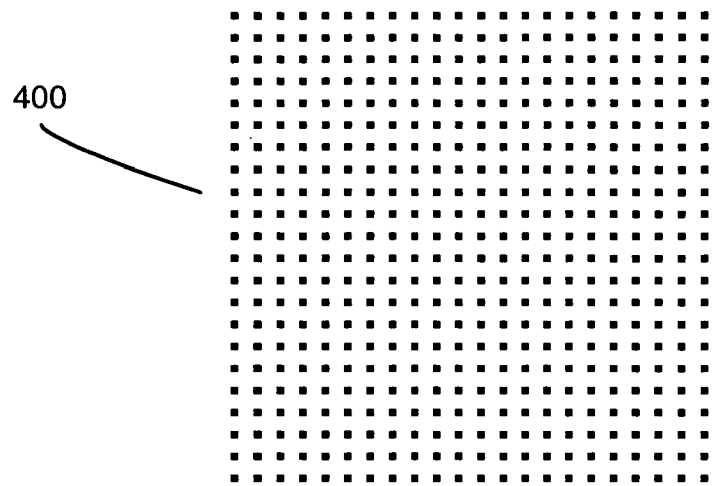
FIG. 4a is a calibration pattern according to an illustrative embodiment of the present application.

Referring to FIG. 4a, a calibration pattern 400 according to an illustrative embodiment of the present application is shown. The calibration pattern consists of several square regions or modules containing black pixels surrounded by white pixels. Such calibration patterns preferably provide efficient calibration of printer-scanner type pairs. There are alternative calibration patterns that may be used including modules having filled diamond shapes, Greek cross figures, other cross figures and other patterns such as approximate filled black circles.

Figure 4B:
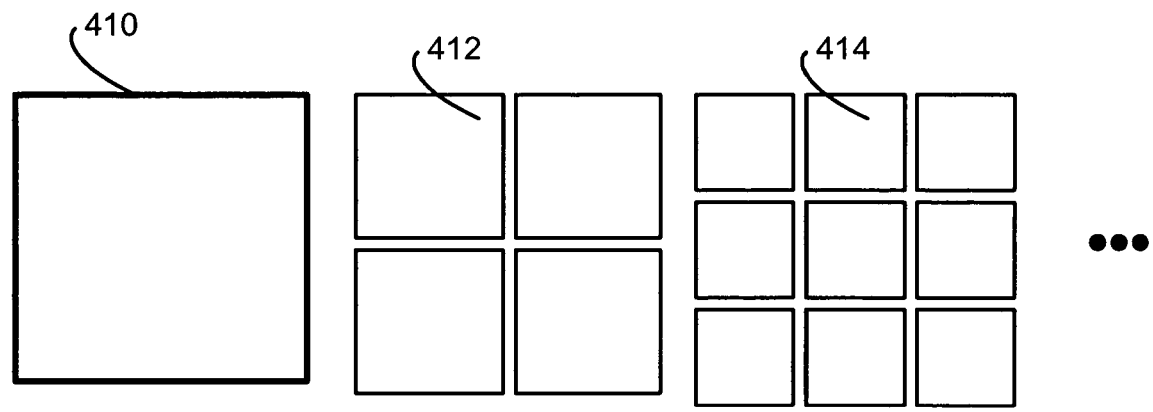
FIG. 4b is a diagram showing a series of calibration patterns according to an illustrative embodiment of the present application.
Figure 4C:
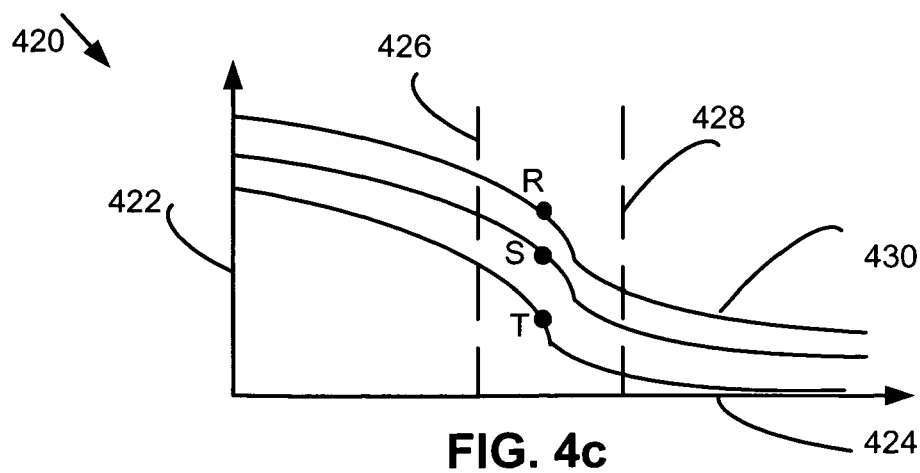
FIG. 4c is a diagram showing a range of useful area to circumference ratios for the series of calibration patterns shown in FIG. 4b.

Referring to FIGS. 4b and 4c, the process of selecting appropriate calibration images is described. FIG. 4b is a diagram showing a series of calibration patterns according to an illustrative embodiment of the present application. The calibration patterns shown are a series of the same size image (they appear to be slightly different sizes to show the module borders) having a different number of square modules 410,

412, 414. The area A in each of 410, 412 and 414 is constant. However, the circumference, which is defined as the sum of the length of the contour in pixels of the border of each of the squares. Accordingly, the circumference of 414 is larger than that of 412 that is larger than that of 410.

FIG. 4c is a diagram 420 showing a range of useful area to circumference ratios for the series of calibration patterns shown in FIG. 4b. The vertical axis 422 shows the A2C ratios that are plotted against the horizontal axis 424 that shows the number of squares in the calibration pattern. Marker 426 shows the lower bound and marker 428 shows the upper bound of the range of useful A2C ratios for the particular calibration patterns as shown along A2C curves R, S, T 430. Accordingly, for a particular printer-scanner type pair and for a particular type of calibration patter, a set of useful ratios may be determined and published. The useful range of ratios is necessarily those that show the greatest change upon the occurrence of the event being detected—namely the change from an original digital file ratio to a second-generation scan ratio. During the calibration process, the calibration image preferably starts as a black and white monochrome image, but as it is scanned and printed, physical effects result in the image being converted to a grayscale image. A calibration pattern may be utilized with modules of 4×4 pixels.

Figure 5:
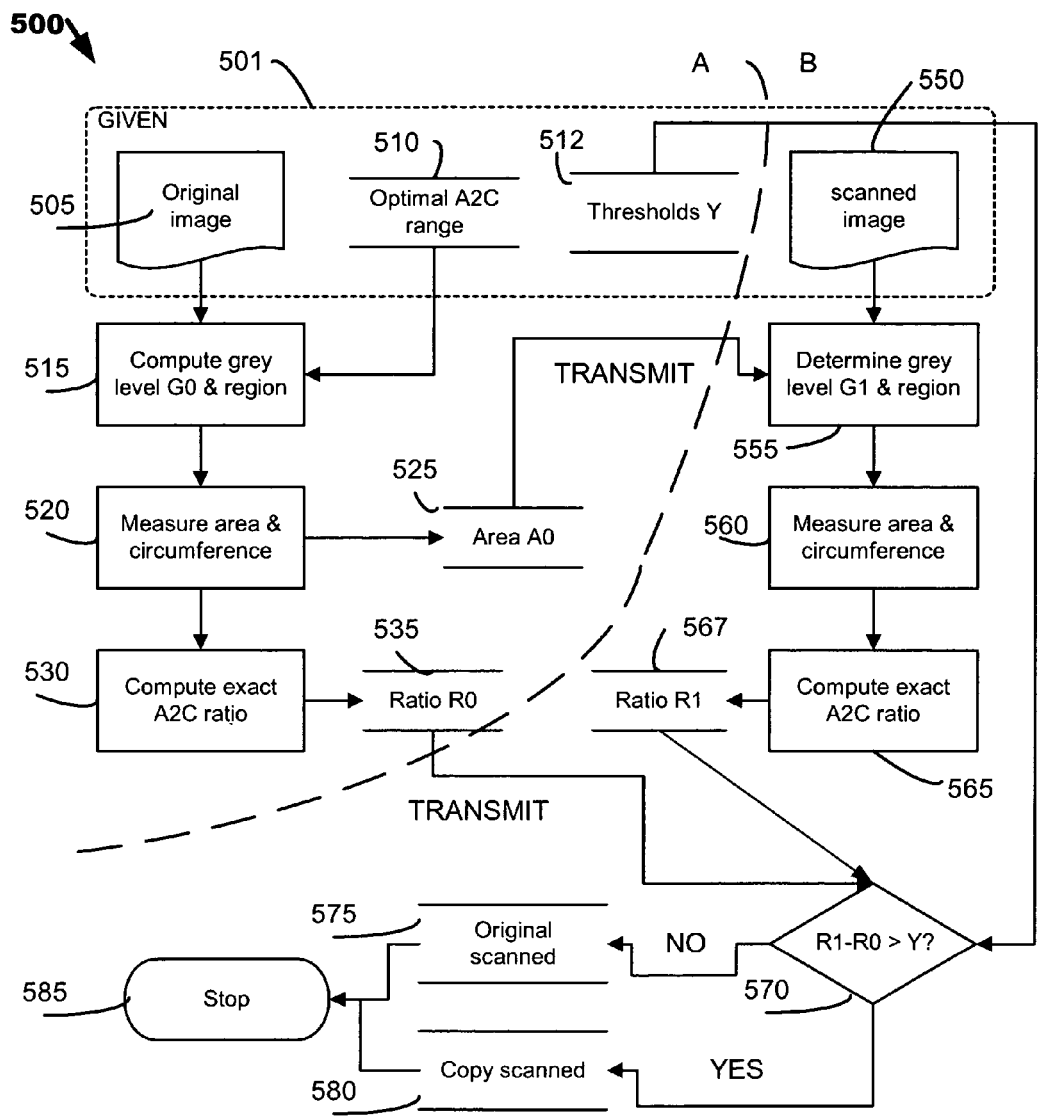
FIG. 5 is a flowchart showing a method detecting copies of images according to an illustrative embodiment of the present application.

Referring to FIG. 5, a flowchart showing a method for detecting copies of documents 500 according to an embodiment of the present application is shown. The small-dashed area indicates a section of known information 501. Furthermore, the large-dashed dividing line shows an area of the diagram to the left (labeled A) that describes the detection preparation portion of the process. Similarly, the area to the right (labeled B) describes the copy detection portion of the process.

In step 505, the original image is known. In step 510, the optimal A2C range is determined. In step 512, the thresholds Y for the A2C ratios is determined. In step 515, the system computes the gray level G0 and the region that corresponds to the optimal A2C range obtained above. In the illustrative example of FIGS. 6a-6c, the gray level 96 is used. In step 520, the system measures the area and circumference and send the expected area A0 in step 525 to the verification system for use in step 555. In step 530, the system computes the exact A2C ratio and in step 535 the system transmits ratio R0 to the verification system for use at step 570.

In step 550, the verification system begins with a scan of an image that is purportedly a scan of the original image. In step 555, the system determines the gray level G1 and region using A0. In the illustrative example of FIGS. 7a-7c, the gray level 103 provides a close fit to the area and is used. In the illustrative example of FIGS. 8a-8c that are processing a counterfeit, the gray level 108 provides a close fit to the area and is used. In step 560, the system measures the area and circumference. In step 565, the system computes the exact measured A2C ratio and in step 567 that ratio R1 is provided to step 570.

In step 570, the threshold Y that is known from step 512 is used with the expected R0 and measured R1 to determine if the scan is of an original print. If $R1-R0>Y$, the system determines in step 580 that the scan is of a counterfeit copy. Otherwise, in step 575, the system determines that the copy is of an original and the process stops in step 585.

In an alternative embodiment that may provide more robust results, the following procedure is followed. The process may be semi-manual such as using PHOTOSHOP CS for processing steps, or could be fully automated with the appropriate hardware and software. The initial portion of the process is a detection preparation process. First, the system receives an initial digital image 1. Then, the system fixes a sample of grey levels $G1, G2, \ldots, Gn$. Next, for each Gi, we measure the area Ai of the region containing all the pixels of I of grey value up to Gi. Then we measure the circumference Ci of the region and we compute the A2C ratio $Ri=Ai/Ci$. We then select the index j where the ratio Rj falls within the range W. Thereafter, the area Aj and the ratio Rj are transmitted (possibly with the image) to the verifying authority.

The next sub-process of the method is a detection process. We are given a scanned image J that is identified as coming from 1. Using successive thresholding, we select a region of J of area A' (rescaled to the resolution of the printer) as close as possible to the area Aj associated with the image I (we test for that the regions containing all the pixels of grey value up to grey levels G for G going from white to black until Aj is best approximated). In at least one embodiment, the captured image is from a sub-portion of the document.

Next, we measure the circumference C' (rescaled to the resolution of the printer) of the region and we compute the A2C ratio $R'=A'/C'$. We then compute $Rj-R'$ and compare it with the threshold Yj associated with the public threshold Yj associated with Rj. If it is greater, then we make a determination that J is a counterfeit made from a copied print. If it is smaller than or equal to the public threshold Yj, we make a determination that J was made from an official print.

Figure 6A:
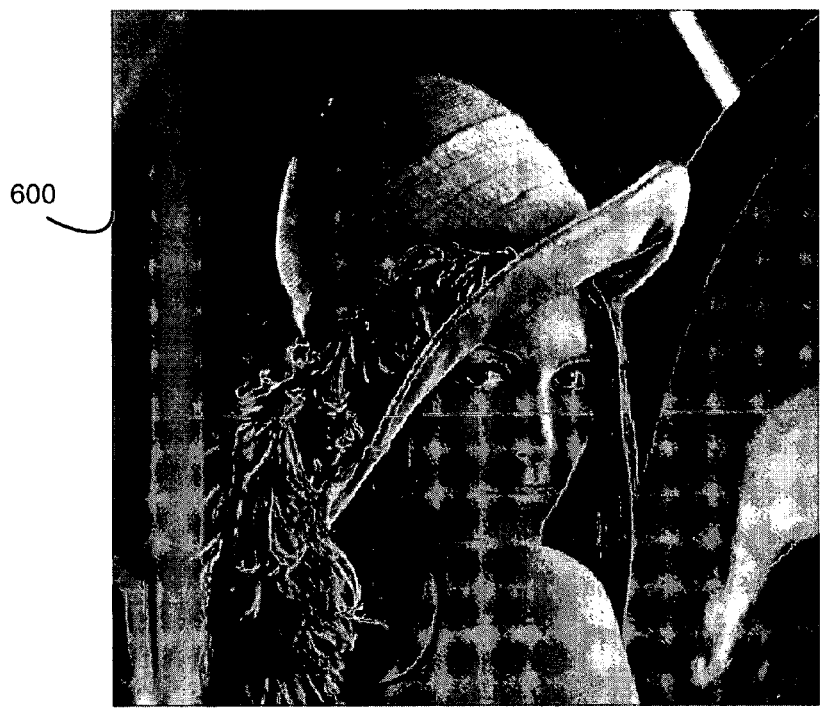
FIG. 6a is an original digital test image according to an illustrative embodiment of the present application.

Referring to FIG. 6a, an original digital test image 600 according to an illustrative embodiment of the present application is shown. The test image 600 represents the digital image file of the Lena test image having 512×512 pixels in 256 grayscales. The physical representation shown as FIG. 6a is necessarily printed for purposes of the application, but represents the digital grayscale bitmap test file. This test file is used to illustrate a copy detection method according to an illustrative embodiment of the present application.

Figure 6B:
FIG. 6b is an original digital threshold test image of FIG. 6a according to an illustrative embodiment of the present application.

Referring to FIG. 6b, an original digital threshold test image 610 Of image 600 at threshold gray level 96 according to an illustrative embodiment of the present application is shown. As described above, known digital image processing systems allow a single gray level to be used as a threshold whereby all pixels at or above the threshold are converted to black and all others are converted to white. Alternatively, other known thresholding processes may be used. Accordingly, for a region of interest or for unions of regions of interest of the image, the area of black pixels (or alternatively white pixels) in the thresholded image can be calculated. Similarly, for the region of interest or for unions of regions of interest, the circumference of the boundary between white and black pixels can be measured. Therefore, an "A2C" area to circumference ratio can be found for a region of interest or a sum of regions of interest. Similarly, and preferably to avoid rescaling issues, an "Ato(Csquared)" area to circumference squared ratio can be found for a region of interest or a sum of regions of interest.

It has been discovered that there is a range of "A2C" ratios that is effective in the illustrative embodiment for copy detection purposes. In an alternative embodiment, "Ato (Csquared)" ratios are used so that the ratio does not have to be rescaled if the scanned images are not scaled to the digital original image. Experimental results have shown that a Ratio R equal to 8.95 and an associated threshold ratio Y=8.6 is effective in detecting copies. With regard to the test figure of FIG. 6a, a brute force sampling of gray level threshold images are processed to find a ratio that falls in the range of effective ratios. For example, if using PHOTOSHOP CS, a histogram slider can be moved across threshold levels and an Area measured display can be monitored until a close fit is achieved. In this case, gray level 96 results in an A2C ratio R of 8.95 for the digital original. The areas of the region of interest (in this case the sum of all of the "islands" of black pixels of the entire image) equals A=111,703 pixels. The circumference (or contour) of the black regions of interest equals 12,495 pixels. Accordingly, the known good area A for the particular original document or image equals A=111,703. That value of A will be associated with the original document such by sending it to the verification computer along with an annotation stating that it applies to the Lena test image. As can be appreciated, other known good area transmission and association techniques may be used and may involve the participation of a third party such as a trusted third party. Accordingly, the public decision threshold for use at the verification computer is Y=8.6. If a scanned image of Lena is tested and found to have an A2C ratio lower than 8.6, it will be considered a counterfeit copy (second generation or higher). If the ratio is higher than 8.6, the image being tested is considered an original or first-generation scan. In an alternative, a portion of the image is selected for testing and the known effective test area A (and the location of the portion to be tested) is transmitted to the verification computer.

Figure 6C:
FIG. 6c is an original digital contour test image of FIG. 6b according to an illustrative embodiment of the present application.

Referring to FIG. 6c, an original digital threshold test image 610 of image 600 at threshold gray level 96 according to an illustrative embodiment of the present application is shown. Here, the digital test image contour is shown that is traced using Photoshop CS to provide the circumference count of a number of pixels equal to C=12,495. In this case, the circumference was determined by selecting the Trace Contour plug-in using PHOTOSHOP CS in the Filters-Stylize menu tree. The lower trace method was selected, but alternatively, the upper trace method may have been selected. In the verification computer, the processed images are processed with whatever threshold is necessary to approximate the known good area A and the resulting contour or circumference measurement is used in the A2C ratio to determine if the scan is a counterfeit copy.

Figure 7A:
FIG. 7a is a printed and scanned test image (first-generation) of the original digital test image of FIG. 6a according to an illustrative embodiment of the present application.

Referring to FIG. 7a, a first-generation print and scan test image 700 of the original digital test image 600 according to an illustrative embodiment of the present application is shown. The test image 600 has been printed using the Epson Photostylus R800 printer and scanned using the Microtek Artixscan 1800F scanner into a first generation print-scan 700 of the digital image file of the Lena test image having 512× 512 pixels in 256 grayscales. For purposes of simplicity and clarity, the first generation scanned digital file is rescaled to the same resolution as the original file. As can be appreciated, such rescaling transformations are known. This test file is used to illustrate the output of the copy detection method in processing an original document or image according to an illustrative embodiment of the present application to test if the method will provide a correct indication of an original image.

Figure 7B:
FIG. 7b is a threshold test image (first-generation) of FIG. 7a according to an illustrative embodiment of the present application.

Referring to FIG. 7b, a print and scan threshold test image (first-generation) 710 of image 700 at threshold gray level 103 according to an illustrative embodiment of the present application is shown. Since it is known at the verification computer that the Lena image should be processed to have a threshold area of as close to A=111,703 pixels as possible, several gray levels are tested in a brute force approach. Alternatively, more elegant area threshold fitting algorithms may be used. Here, a gray level threshold at gray level 103 results in an area A=111,566 pixels which is close enough to use for the A2C test.

Figure 7C:
FIG. 7c is a contour test image (first-generation) of FIG. 7b according to an illustrative embodiment of the present application.

Referring to FIG. 7c, a print and scan contour test image (first-generation) 720 of image 710 at threshold gray level 103 according to an illustrative embodiment of the present application is shown. Using the image of FIG. 7b and Photoshop CS, the contour of the regions of interest are traced and the circumference measured in pixels. The number of pixels counted here is 12,832. Accordingly the computed ratio R'=111,566/12832=8.69. Because R' is above the threshold of Y=8.6, the system has correctly identified that FIG. 7a is a scan of an original print.

Figure 8A:
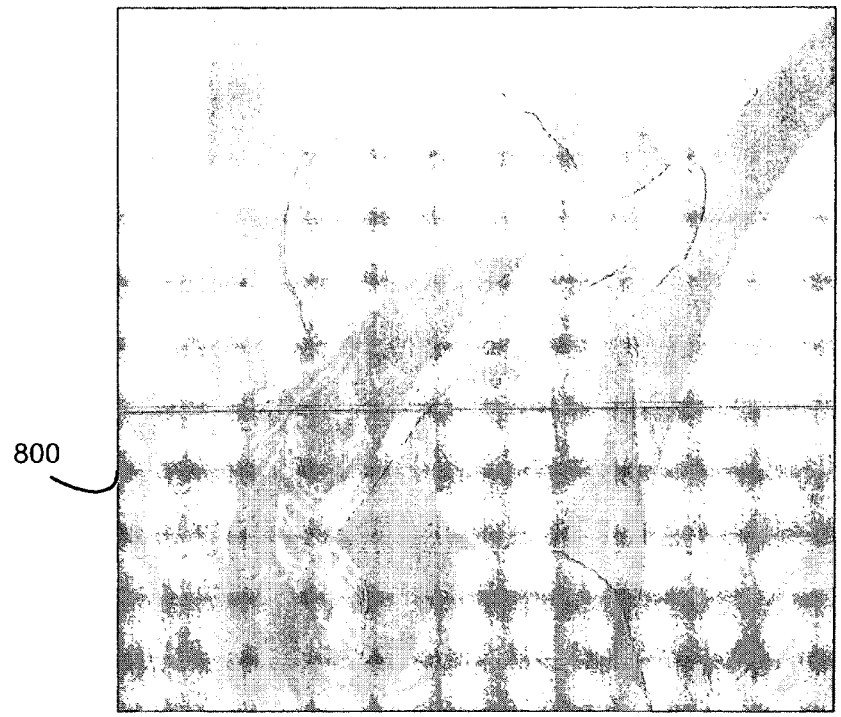
FIG. 8a is a printed and scanned test image (second-generation) of the original digital test image according to an illustrative embodiment of the present application.

Referring to FIG. 8a, a second-generation print and scan test image 800 of the original digital test image 600 according to an illustrative embodiment of the present application is shown. The first generation test image 700 has been printed using the Epson Photostylus R800 printer and scanned using the Microtek Artixscan 1800F scanner into a second-generation print-scan 800 of the digital image file of the Lena test image having 512×512 pixels in 256 grayscales. This test file is used to illustrate the output of the copy detection method in processing a counterfeit or "copy" document or image according to an illustrative embodiment of the present application. As used herein, the term copy is not meant to apply to "replaying" or reprinting the digital image to create a second original, but rather a document that has been through the physical print-scan transformation more than once.

Figure 8B:
FIG. 8b is a threshold test image of FIG. 8a (second-generation) according to an illustrative embodiment of the present application.

Referring to FIG. 8b, a print and scan threshold test image (second-generation) 810 of image 800 at threshold gray level 108 according to an illustrative embodiment of the present application is shown. Since it is known at the verification computer that the Lena image should be processed to have a threshold area of as close to A=111,703 pixels as possible, several gray levels are tested in a brute force approach. Alternatively, more elegant area threshold fitting algorithms may be used. Here, a gray level threshold at gray level 108 results in an area A=110,557 pixels which is close enough to use for the A2C test.

Figure 8C:
FIG. 8c is a contour test image of FIG. 8b (second-generation) according to an illustrative embodiment of the present application.

Referring to FIG. 8c, a print and scan contour test image (second-generation) 820 of image 810 at threshold gray level 108 according to an illustrative embodiment of the present application is shown. Using the image of FIG. 8b and Photoshop CS, the contour of the regions of interest are traced and the circumference measured in pixels. The number of pixels counted here is 13,100. Accordingly the computed ratio R"=110,557/13100=8.44. Because R" is below the threshold of Y=8.6, the system has correctly identified that FIG. 8a is a scan of a counterfeit copy of at least a second generation.

As described above, and as applicable to each embodiment, the area to circumference ratios described may be replaced with area over the circumference squared to avoid rescaling issues.

In an alternative applicable to any embodiment herein, another trace contour plug-in may be utilized with Photoshop. Similarly, a trace contour tool may be developed in MATHCAD, MATLAB or a lower level programming language such as C. In yet another alternative applicable to any embodiment herein, the contour or a contour analog may be utilized as a mathematical contour using a Laplace filter or any zero-sum filter.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method for determining originality of a document using a computer comprising:
   obtaining a captured image of the document received from an image scanning device using the computer;

obtaining an expected area-to-circumference ratio using the computer;

obtaining an expected area for the document using the computer;

determining a gray level threshold of the captured image that reasonably closely corresponds to the expected area of the document using the computer;

determining a contour of the captured image at the determined gray level threshold using the computer;

measuring the circumference of the contour using the computer;

determining a measured area-to-circumference ratio using the computer; and determining originality of the document using the computer and using the measured area-to-circumference ratio and the expected area-to-circumference ratio.

2. The method according to claim 1, further comprising:
performing a rescale process on the captured image using the computer.

3. The method according to claim 1, wherein the captured image is from a sub-portion of the document.

4. The method according to claim 1, wherein processing the threshold fitting to the expected area is by brute force calculation using a histogram slider to select a close fit to the expected area.

5. The method according to claim 1, wherein processing the threshold fitting to the expected area is by binary tree sorting.

6. The method according to claim 5, wherein the square of the circumference is used in each ratio.

7. The method according to claim 1, wherein the expected area is obtained from a trusted third party.

8. The method according to claim 1, wherein the expected area-to-circumference ratio is calibrated for a particular printer type and scanner type.

9. The method according to claim 1, wherein the expected area-to-circumference ratio is selected between a calibration ratio for a digital calibration image and a calibration ratio for a second generation print-scan of the calibration image.

10. The method according to claim 1, wherein the contour of the captured image is determined using a trace contour plug-in with a raster image processing system.

11. The method according to claim 1, wherein the contour of the captured image is determined using a Laplace filter.

12. The method according to claim 1, wherein the contour of the captured image is determined using zero-sum filter.

13. The method according to claim 8, wherein the expected area-to-circumference ratio is calibrated using a calibration pattern having square shaped modules.

14. The method according to claim 8, wherein the expected area-to-circumference ratio is calibrated using a calibration pattern having diamond shaped modules.

15. The method according to claim 1, wherein the expected area-to-circumference ratio is obtained from a trusted third party.

* * * * *